US006608761B2

United States Patent
Wachel

(10) Patent No.: US 6,608,761 B2
(45) Date of Patent: Aug. 19, 2003

(54) MULTIPLE PROCESSOR CARDS ACCESSING COMMON PERIPHERALS VIA TRANSPARENT AND NON-TRANSPARENT BRIDGES

(75) Inventor: Robert D. Wachel, Altadena, CA (US)

(73) Assignee: Intel Corporation, Santa Clara, CA (US)

(*) Notice: Subject to any disclaimer, the term of this patent is extended or adjusted under 35 U.S.C. 154(b) by 250 days.

(21) Appl. No.: 09/751,795

(22) Filed: Dec. 29, 2000

(65) Prior Publication Data

US 2002/0085361 A1 Jul. 4, 2002

(51) Int. Cl.[7] .............................. H05K 7/10; G06F 13/36
(52) U.S. Cl. ...................... 361/785; 361/788; 361/803; 710/306
(58) Field of Search .............................. 361/684, 686, 361/785, 788, 790, 796, 803; 710/310, 302, 306; 439/65, 74, 525

(56) References Cited

U.S. PATENT DOCUMENTS

| 5,848,252 | A | * | 12/1998 | Granau et al. .............. 710/306 |
| 6,092,139 | A | * | 7/2000 | Crane et al. ................. 710/307 |
| 6,112,271 | A | * | 8/2000 | Lanus et al. ................. 710/306 |
| 6,282,599 | B1 | * | 8/2001 | Gallick et al. ............... 710/306 |
| 6,349,037 | B1 | * | 2/2002 | Draughn et al. ............. 361/788 |

* cited by examiner

*Primary Examiner*—John B. Vigushin
(74) *Attorney, Agent, or Firm*—Kenyon & Kenyon

(57) ABSTRACT

In a Compact PCI system, a method and apparatus for bridging multiple PCI segments in a chassis utilizing backplane connections, instead of a front side component slot. Embodiments of the present invention may be used, with either a transparent or non-transparent bridging system, between multiple PCI segments, to increase the number of shared peripherals in a single Compact PCI chassis.

20 Claims, 3 Drawing Sheets

US 6,608,761 B2

MULTIPLE PROCESSOR CARDS ACCESSING COMMON PERIPHERALS VIA TRANSPARENT AND NON-TRANSPARENT BRIDGES

FIELD OF THE INVENTION

The present invention relates to connecting electrical devices. More particularly, the present invention relates to bridging multiple PCI segments within a PCI chassis.

BACKGROUND OF THE INVENTION

Peripheral Component Interconnect (PCI) busses are well known in the field of personal computers (PCs). PCI busses are often used to interconnect a central processor unit (CPU) with other surrounding chips on a PC motherboard, or to connect various other computer components. The popularity and widespread acceptance of PCI busses for efficiently transferring signals among devices has been so great that variations have developed and become industry standards.

Compact PCI® is a variation of the PCI bus specification that is widely used in the field of industrial controls and instrumentation. The Compact PCI® Specification (PICMG 2.0 R3.0 Oct. 1, 1999) is an open specification supported by the PCI Industrial Computer Manufacturers Group (PICMG). Much hardware is available that complies with the Compact PCI® standards for rack mounted equipment. For the purposes of this disclosure, knowledge of Compact PCI® standards will be assumed. These standards will be referred to as the "CPCI" standards, which incorporate many aspects of the conventional PCI bus standards. Hardware and equipment designed to conform with the CPCI standards will be referred to as CPCI hardware or CPCI components. Unless explicitly described otherwise, for the purpose of the present disclosure, the CPCI standards for form factor 6U boards (233.35 mm by 160 mm) will be used.

The CPCI standards are primarily directed at configurations of PCI segments mounted in a chassis. Each PCI segment may contain up to 8 slots for individual cards. However, the same standards define chassis dimensions with the capacity for 21 slots. As a result of this difference between the maximum number of PCI cards in a PCI segment and the size of an off-the-shelf CPCI chassis, many embodiments of CPCI hardware do not fully utilize the chassis space. That is, they may use 8 slots for PCI cards and either leave the remaining space in the chassis unused, or use the space for non-PCI purposes.

In some contexts efficient space utilization is a particular concern. Telephone Company (Telco) switching offices are one. In such a Telco environment, a chassis with only 8 of 21 slots occupied by equipment is not desirable because it is an inefficient use of space. It would be desirable to have an apparatus or method to make more efficient use of the chassis capacity.

Increasing the number of slots in a bus segment to more than eight requires one or more PCI bridges. Such bridges, both transparent and non-transparent, are known to those of ordinary skill in the art. However, such bridges typcially occupy one of the slots in the CPCI chassis. It would be desirable to bridge between PCI segments without "tying up" a slot in the chassis thus allowing each of the 21 slots to be available for non-bridge PCI cards.

DETAILED DESCRIPTION

Figure 1A:
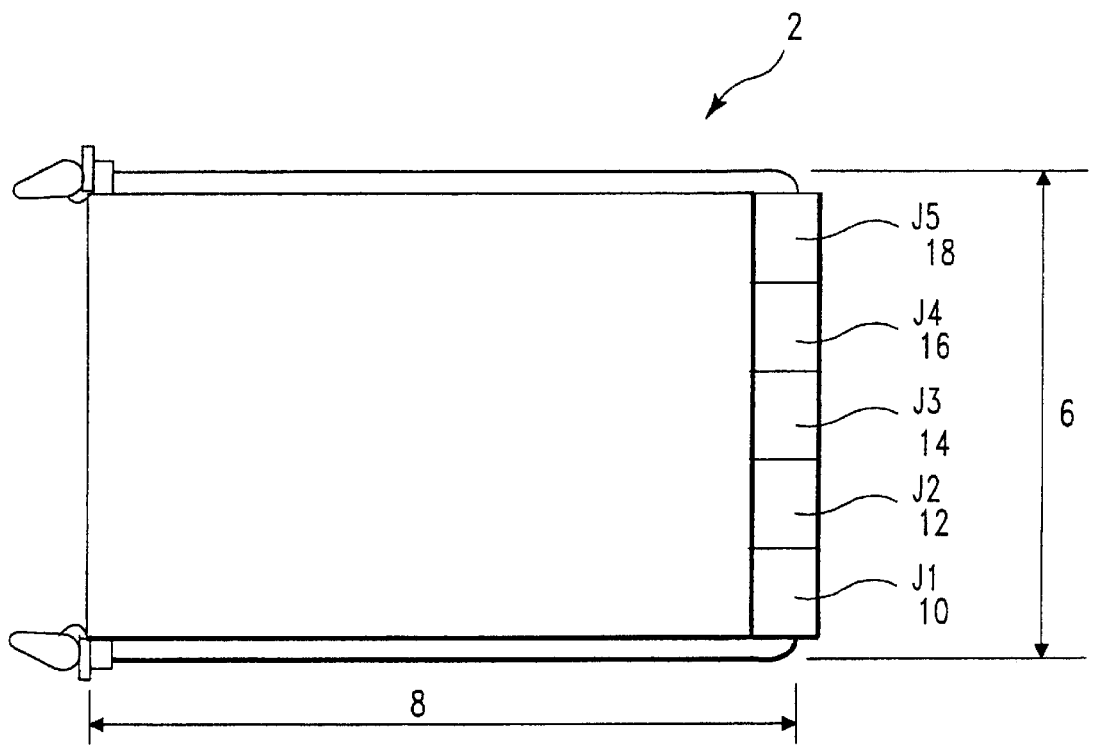
FIGS. 1A and 1B depict typical CPCI front side and backside add-in cards.

The present invention is directed at a method and apparatus for bridging between PCI segments in a system of CPCI components, without occupying a component slot, thus permitting a greater density of components in a CPCI chassis.

A CPCI system typically is comprised of printed circuit board (PCB) with plurality slots on each surface, where a number of plug-in, or add-in component cards may be connected to the PCB. The plug-in cards may be linked via one or more PCI busses. The CPCI specification allows 21 such slots on each side of the PCB. Within the PCB, the "midplane" is the term used to describe the location of the electrical paths, such as busses and traces, for routing the various electrical signal connections within the PCB, such as electrical signals between the plug-in cards. The electrical properties of the traces, including stub terminations and characteristic impedance ranges, are specified in the CPCI standards. The two sides of the PCB are referred to as the front side (or main board) and the backplane, each of which may contain 21 component slots spaced at 0.8 inches (20.32 mm) center-to-center, as specified in the CPCI standards. The pins providing electrical connections within the slots typically pass through the PCB so that a connection to a particular pin can be made (electrically) on either the front side or the backplane, which also causes the pin layouts on the front side and backplane to be mirror images of each other. The pin layouts within each slot are typically 5 per row by 113 row arrays of pins, with a 2 mm by 2 mm square grid spacing. The pins in each slot are defined, in the CPCI standards, as belonging to one of five groups, labeled from bottom to top as P1 through P5 for connection to connectors labeled J1 through J5 respectively. In some embodiments of the present invention, the pins are different lengths allowing "hot swapping" of plug-in cards.

The CPCI standards are primarily directed at defining the uses the P1 and P2 groups of pins which occupy the bottom 25 rows and next 22 rows of pins, respectively, and the traces connecting these pins for implementing a PCI bus. Pins in groups P3, P4 and P5 may be used for other purposes, such as implementing an H.110 bus, Ethernet, asymmetric transfer made (ATM), synchronous optical network (SONET) protocols, and are not reserved for the PCI bus.

The CPCI standards allow 160 mm by 233.35 mm add-in cards, with female connectors J1 through J5 mounted on the cards for attachment to either the front side or backplane slots. In a Telco environment, the front side is typically used for cards containing active components, such as processors, that may occasionally need to be removed and serviced. It is the active component containing cards that are typically connected to the PCI bus, and thus utilize the J1 and J2 connectors. The backplane is then typically reserved for transition cards. Transition cards are known to those of ordinary skill in the art. These transition cards may be used to connect external I/O cables, such as T1, ATM and SONET lines, to connectors J3 through J5. The above division of functionality between front side and backplane cards permits servicing and replacement of active components without disturbing the cabling secured to transition cards. As explained more fully below, the present invention exploits the fact that the transition cards, mounted on the backplane, do not typically utilize the P1 and P2 groups of pins, or require connectors J1 and J2.

The front side cards may be connected to a PCI bus. However, the CPCI standards limit such busses to 8 cards while 21 cards fit in the chassis. In order to connect more than 8 cards to a PCI segment bridge, either a transparent or a non-transparent, is required. Such bridges are known to those of ordinary skills in the art, and they typically occupy one slot each on the frontplane. The present invention, unlike prior art bridges, do not require a frontplane slot.

Figure 1B:
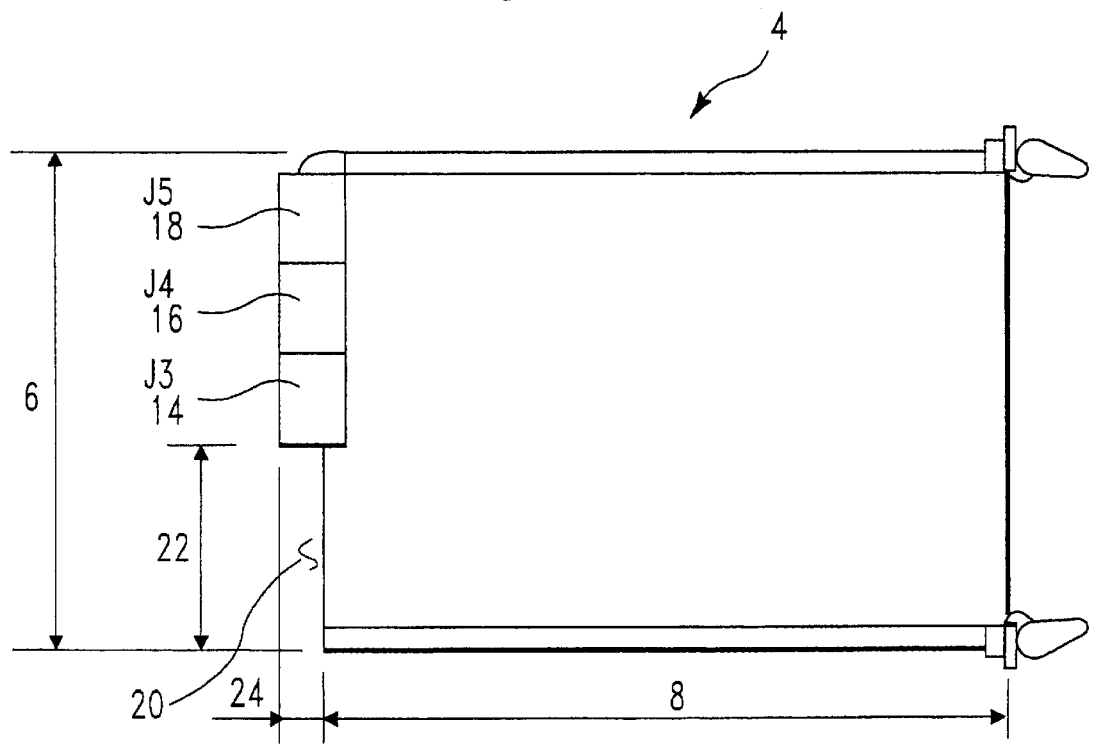

FIGS. 1A and 1B depict typical front side and backplane add-in cards, corresponding to a PCI bus component card 2 and a transition card 4, respectively. Both types of cards have a 6U form factor with a height 6 of 160 mm (9.20 inches) and a depth 8 of 233.35 mm (6.30 inches). Component card 2 has five connectors, J1 through J5 (references 10, 12, 14, 16 and 18) numbered from bottom to top. In contrast, transition card 4 typically uses only J3 14, J4 16 and J5 18 connectors. The omission of connectors J1 and J2 from transition card 4 creates notch 20 with a notch height 22 of approximately 93.8 mm (3.69 inches) and a notch depth 24 of approximately 20.0 mm (0.79 inches). The existence of notch 20 on two adjacent transition cards 4 provides a mounting location for a bridge in accordance with an embodiment of the present invention.

The J1 10 and J2 12 connectors carry all of the PCI signals necessary for implementation of a PCI bus. Therefore, a PCI bridge need only connect individual PCI segments via the J1 10 and J2 12 connectors. That is, the J3 14, J4 16 and J5 18 connectors may be omitted from such a PCI bridge. Prior art PCI bridges typically utilize a full size card, mounted in a slot on the front side, similar to component card 2 depicted in FIG. 1A. Instead, an embodiment of the present invention locates the PCI bridge in notch 20, on the backplane, effectively freeing a front side slot compared to a prior art PCI bridge.

PCI bridges are known to those of ordinary skill in the art, and fall into two types: transparent and non-transparent bridges. The present invention may be used with either type of bridge to connect individual PCI segments. As the present invention is directed toward a unique means of connecting the PCI segments, and not PCI bridge data transfer protocols, the present disclosure will not address the detailed signaling environments within such a PCI bridge nor will transparent and non-transparent bridges be distinguished. Those of ordinary skill in the art will recognize that systems using transparent bridges would typically use a single "host" card and two bridges to connect all 21 slots, while allowing a single host access to all the other 20 peripheral slots. On the other hand, systems using non-transparent bridges would typically use one host card per PCI segment. The present invention may also be used to bridge PCI segment in embodiments where less than all slots are used. E.g., two seven slot segments might be connected on a chassis with 7 unused slots.

The PCI bridges of the present invention, like prior art PCI bridges mounted on front side slots, require one or more processors to performing the bridging functions between individual PCI segments. While such processors are a part of the overall PCI bridge, whether transparent or non-transparent, the present invention is not intended to be restricted to any particular processor. Those of ordinary skill in the art will recognize that the present invention may be adapted and used with a wide variety of PCI bridge architectures found in prior art front side slot mounted cards, without requiring that the bridge use a front side slot.

Figure 2:
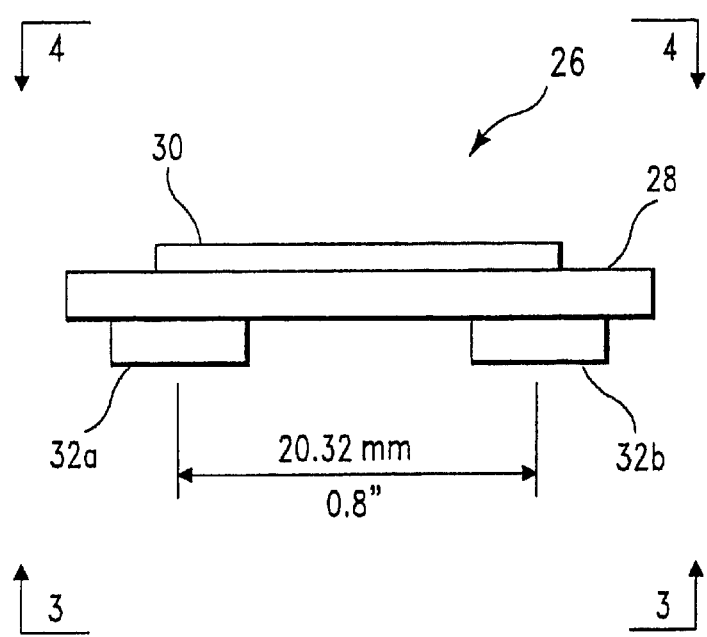
FIG. 2 depicts a PCI bridge card in accordance with an embodiment of the present invention.
Figure 3:
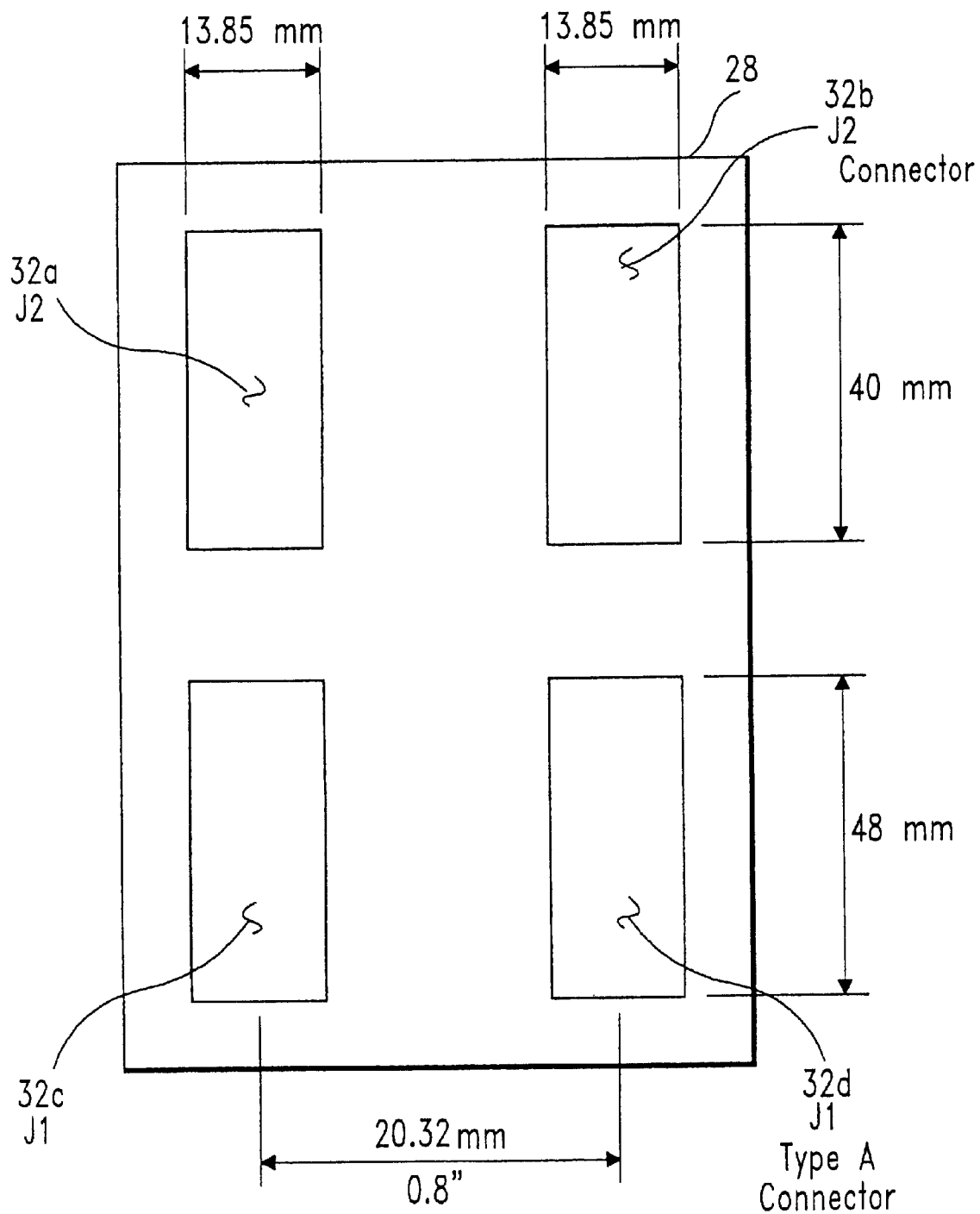
FIG. 3 is a section view of a PCI bridge card in accordance with an embodiment of the present invention.

FIG. 2 depicts a PCI bridge card 26 in accordance with an embodiment of the present invention. A printed circuit board (PCB) 28 with one or more bridge processors 30 is configured with female connectors 32a and 32b, for connecting PCI bridge card 26 to the backplane of the PCI chassis. Although the present invention is preferably used to bridge adjacent slots, spaced 0.8" apart, those of ordinary skill in the art will recognize that embodiments could be configured to bridge non-adjacent slots. FIG. 3 is a sectional view of PCI bridge card 26 depicting J1 10 connectors 32c and 32d along with J2 12 connectors 32a and 32b, for connecting two adjacent sets of pins on the backplane in the location of notch 20. Both front side cards 2 and transition cards 4, depicted in FIGS. 1A and 1B mount "edgewise" in the slots on the PCI chassis, or perpendicular to the PCI chassis, PCI bridge card 26, in contrast, mounts parallel to the PCI chassis spanning notch 20 location of adjacent transition cards 4. The current invention thus uses the locations of the "missing" J1 10 and J2 12 connectors of transition cards 4, on the backplane. As shown on FIG. 3, the spacing between connectors 32a/32c and 32b/32d, at 20.32 mm (0.8 inches) center-to-center, matches the slot spacing on a PCI chassis. Similarly, the J1 10 and J2 12 connectors on PCI bridge 26 conform to the CPCI standards.

Figure 4:
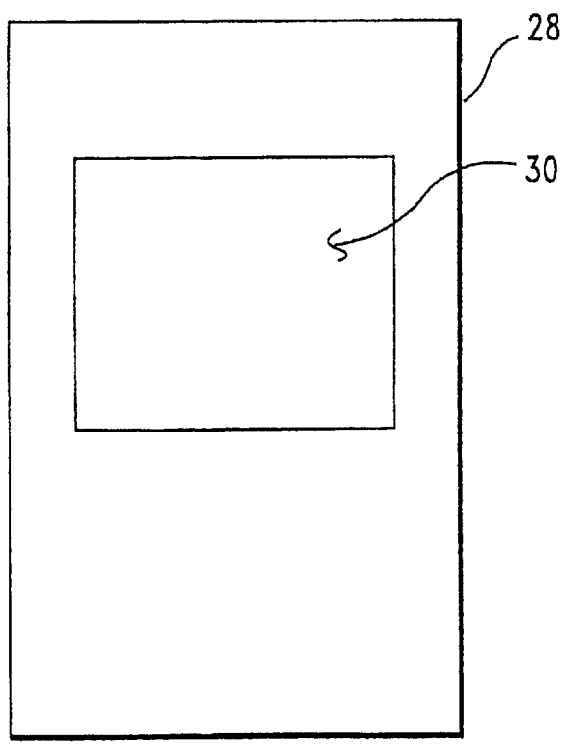
FIG. 4 is another section view of a PCI bridge card in accordance with an embodiment of the present invention.

FIG. 4 is a sectional view from the opposite side of PCI bridge card 26 of FIG. 3, which depicts a processor 30 mounted on PCB 28. As discussed above, while processor 30 is an important component of a typical PCI bridge card 26, the present invention is directed to the connection of the PCI bridge to the PCI chassis on the backplane, not to any particular processor 30 or any particular signal routing within PCB 28.

As is the case with prior art PCI bridges, using slots on the front side of the PCI chassis, when multiple busses are present on a single PCI chassis those busses are preferably of the same type. For example, if three PCI segments are present on a single PCI chassis, then the segments may be bridged with either transparent or non-transparent bridges, but are not preferably a combination of both. The engineering design issues and parameters of transparent and non-transparent bridges are known to those of ordinary skill in the art.

While embodiments and applications of the present invention have been shown and described, it would be apparent to those skilled in the art, after a review of this disclosure, that many more modifications than mentioned above are possible without departing from the inventive concepts herein. The present invention, therefore, is not to be restricted except in the spirit of the appended claims.

What is claimed is:

1. In a system including a plurality of PCI segments, with each said PCI segment comprising one or more PCI cards mounted in slots on a PCI chassis, a bridge for electrically coupling PCI segments, said bridge comprising:

a hoard; and a plurality of connectors mounted on said board for electrically connecting said board to a PCI card of a first PCI segment and a PCI card of a second PCI segment on a backplane of the PCI chassis.

2. A bridge in accordance with claim 1, wherein:

said plurality of connectors are J1 and J2 connectors.

3. A bridge in accordance with claim 1, wherein:

said board has four connectors for connection to the P1 and P2 groups of pins of said first and second PCI segments.

4. A bridge in accordance with claim 1, further comprising:
   a processor mounted on said board and electrically connected to said plurality of connectors, wherein said processor logically connects said first and second PCI segments with a transparent bridge.

5. A bridge in accordance with claim 1, further comprising:
   a processor mourned on said board and electrically connected to said plurality of connectors, wherein said processor logically connects said first and second PCI segments with a non-transparent bridge.

6. A bridge in accordance with claim 1, wherein:
   said board electrically connects to said first and said second PCI segments in adjacent slots on the PCI chassis.

7. A bridge in accordance with claim 1, wherein:
   said board electrically connects to said first and said second PCI segments in non-adjacent slots on the PCI chassis.

8. A bridge in accordance with claim 1, wherein:
   said board is configured to mount on said backplane of the PCI chassis in the slot occupied by a transition card.

9. A bridge in accordance with claim 1, wherein;
   said plurality of connectors connect only to groups of P1 and P2 pins.

10. In a system including at least three PCI segments, with each PCI segment comprising one or more PCI cards mounted in slots on a PCI chassis, a bridge for connecting to PCI segments, said bridge comprising:
    a first board;
    a plurality of first board connectors mounted on said first board for electrically connecting said first board to a first and a second PCI segment on the backplane of the PCI chassis;
    a second board;
    a plurality of second board connectors mounted on said second board for electrically connecting said second board to said second and a third PCI segment on the backplane of the PCI chassis.

11. A bridge in accordance with claim 10, further comprising:
    a first processor mounted on said first board and electrically connected to said plurality of first board connectors;
    a second processor mounted on said second board and electrically connected to said plurality of second board connectors; and
    wherein said first processor and said second processor logically connect said first, said second, and said third PCI segments with a transparent bridge.

12. A bridge in accordance with claim 10, further comprising:
    a first processor mounted on said first board and electrically connected to said plurality of first board connectors;
    a second processor mounted on said second board and electrically connected to said plurality of second board connectors; and
    wherein said first processor and said second processor logically connect said first, said second, and said third PCI segments with a non-transparent bridge.

13. A bridge in accordance with claim 10, wherein:
    said first board and said second board are identical; and
    said first processor and said second processor are identical.

14. A method of bridging a plurality of PCI segments mounted on a PCI chassis without occupying a front side slot of said PCI chassis, comprising:
    connecting a first PCI segment card and a second PCI segment card with a first PCI bridge hoard; and
    locating said PCI bridge board along a backplane.

15. A method in accordance with claim 14, further comprising:
    mounting said PCI bridge board in a notch between the PCI chassis and a transition card.

16. A method in accordance with claim 14, further comprising:
    connecting a second PCI segment card and a third PCI segment card with a second PCI bridge board; and
    locating said PCI bridge board along said backplane.

17. A method in accordance with claim 16, wherein:
    bridging said first, said second, and said third PCI segments with said first and said second PCI bridge boards is performed with a transparent bridge.

18. A method in accordance with claim 16, wherein:
    bridging said first, said second, and said third PCI segments with said first and said second PCI bridge boards is performed with a non-transparent bridge.

19. A method of bridging PCI segments on a PCI chassis, comprising:
    connecting a pair of adjacent PCI cards of adjacent PCI segments with a PCI bridge board across the Groups of P1 and P2 pins on the backplane of a pair of adjacent PCI slots; and
    orienting said PCI bridge board substantially parallel to the PCI chassis.

20. A method in accordance with claim 19, further comprising:
    installing transition cards on the backplane of said pair of adjacent PCI slots substantially perpendicular to the PCI chassis.

* * * * *

UNITED STATES PATENT AND TRADEMARK OFFICE
CERTIFICATE OF CORRECTION

PATENT NO.    : 6,608,761 B1
DATED         : August 19, 2003
INVENTOR(S)   : Robert D. Wachel Page 1 of 1

It is certified that error appears in the above-identified patent and that said Letters Patent is hereby corrected as shown below:

<u>Column 4,</u>
Line 58, "a hoard; and" should be -- a board; and --

<u>Column 5,</u>
Line 11, "a processor mourned" should be -- a processor mounted --

<u>Column 6,</u>
Line 21 "PCI bridge hoard" should be -- PCI bridge board; --

Signed and Sealed this

Sixteenth Day of November, 2004

JON W. DUDAS
*Director of the United States Patent and Trademark Office*